(12) United States Patent
Dong et al.

(10) Patent No.: US 12,438,796 B2
(45) Date of Patent: Oct. 7, 2025

(54) DEVICE TYPE IDENTIFICATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Zhicheng Dong, Shenzhen (CN); Chenchen Peng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 448 days.

(21) Appl. No.: 17/990,553

(22) Filed: Nov. 18, 2022

(65) Prior Publication Data

US 2023/0083404 A1 Mar. 16, 2023

Related U.S. Application Data

(63) Continuation of application No. PCT/CN2021/120676, filed on Sep. 26, 2021.

(30) Foreign Application Priority Data

Oct. 16, 2020 (CN) .......................... 202011106539.7

(51) Int. Cl.
*G06F 15/16* (2006.01)
*H04L 9/40* (2022.01)
(Continued)

(52) U.S. Cl.
CPC .............. *H04L 43/10* (2013.01); *H04L 43/12* (2013.01); *H04L 63/1433* (2013.01)

(58) Field of Classification Search
CPC ...... H04L 43/10; H04L 43/12; H04L 63/1433
See application file for complete search history.

(56) References Cited

U.S. PATENT DOCUMENTS 9,794,281 B1 * 10/2017 Radlein ............... H04L 63/1458
2016/0071016 A1 * 3/2016 Goyal .................... G06N 5/045
706/47
(Continued)

FOREIGN PATENT DOCUMENTS

CN 108418727 A 8/2018
CN 110380925 A 10/2019
(Continued)

OTHER PUBLICATIONS

Tencent Technology, ISR, PCT/CN2021/120676, Jan. 6, 2022, 2 pgs.

(Continued)

*Primary Examiner* — Normin Abedin
(74) *Attorney, Agent, or Firm* — Morgan, Lewis & Bockius LLP

(57) ABSTRACT

This application relates to a device type identification method performed by a computer device. The method includes: transmitting a port open/closed state probe packet to at least two target devices; receiving port open/closed state information returned by the at least two target devices in response to the port open/closed state probe packet, wherein the port open/closed state information comprises port open/closed state vectors indicating whether each port of the at least two target devices is open or closed; extracting a port open/closed state feature from the port open/closed state information; performing decision classification on the port open/closed state feature through a decision tree classifier; and determining a device type of each of the at least two target devices according to a result obtained from the decision classification.

17 Claims, 11 Drawing Sheets

(51) Int. Cl.
*H04L 43/10* (2022.01)
*H04L 43/12* (2022.01)

(56) References Cited

U.S. PATENT DOCUMENTS

2018/0270229 A1* 9/2018 Zhang .................. H04W 12/06
2019/0286826 A1* 9/2019 Bargury ............. H04L 63/0227
2020/0169878 A1   5/2020 Thomas et al.

FOREIGN PATENT DOCUMENTS

CN     110445689 A    11/2019
CN     112016635 A    12/2020

OTHER PUBLICATIONS

Tencent Technology, WO, PCT/CN2021/120676, Jan. 6, 2022, 5 pgs.
Tencent Technology, IPRP, PCT/CN2021/120676, Apr. 13, 2023, 6 pgs.

* cited by examiner

DEVICE TYPE IDENTIFICATION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/120676, entitled "METHOD AND APPARATUS FOR IDENTIFYING DEVICE TYPE, COMPUTER DEVICE, AND STORAGE MEDIUM" filed on Sep. 26, 2021, which claims priority to Chinese Patent Application No. 202011106539.7, filed with the State Intellectual Property Office of the People's Republic of China on Oct. 16, 2020, and entitled "DEVICE TYPE IDENTIFICATION METHOD AND APPARATUS, COMPUTER DEVICE, AND STORAGE MEDIUM", all of which are incorporated herein by reference in their entirety.

FIELD OF THE TECHNOLOGY

This application relates to the field of artificial intelligence and cloud technology, and in particular, to a device type identification method and apparatus, a computer device, and a storage medium.

BACKGROUND OF THE DISCLOSURE

With the continuous development of network technology, various devices that can be connected to a network for interaction have emerged. A terminal on a user side can be connected to the device through the network to perform corresponding interaction. For example, a user controls an Internet of Things (IoT) device through a smartphone, or receives information acquired by the IoT device.

Before a to-be-identified target device on a network side is interacted with, a security scan is usually performed on the target device, to identify whether the target device is a security device. A conventional security scan solution is as follows: sending port request packets based on different communication protocols to each port of the target device on the network side, then receiving message data for representing port identity returned by the target device, and then analyzing the message data, to determine a device type to which the target device belongs, such as determining whether the target device is the IoT device.

However, because most of the devices erase port identities based on information security considerations, the device type corresponding to the target device cannot be accurately identified when the conventional security scan solution is used.

SUMMARY

According to various embodiments of this application, a device type identification method and apparatus, a computer device, and a storage medium are provided.

A device type identification method is provided, the method including:
transmitting a port open/closed state probe packet to at least two target devices;
receiving port open/closed state information returned by the at least two target devices in response to the port open/closed state probe packet, wherein the port open/closed state information comprises port open/closed state vectors indicating whether each port of the at least two target devices is open or closed;
extracting a port open/closed state feature from the port open/closed state information;
performing decision classification on the port open/closed state feature through a decision tree classifier; and
determining a device type of each of the at least two target devices according to a result obtained from the decision classification.

In an embodiment, the selecting a target attribute from an attribute set includes:
selecting the target attribute from the attribute set based on a Gini index or information gain.

A device type identification apparatus is provided, the apparatus including:
a transmission module, configured to transmit a port open/closed state probe packet to at least two target devices;
a receiving module, configured to receive port open/closed state information returned by the at least two target devices in response to the port open/closed state probe packet, wherein the port open/closed state information comprises port open/closed state vectors indicating whether each port of the at least two target devices is open or closed;
an extraction module, configured to extract a port open/closed state feature from the port open/closed state information;
a classification module, configured to perform decision classification on the port open/closed state feature through a decision tree classifier; and
a determining module, configured to determine a device type of each of the at least two target devices according to a result obtained from the decision classification.

A computer device is provided, including a memory and a processor, the memory storing a computer program, and the processor, when executing the computer program, performing the following steps:
transmitting a port open/closed state probe packet to at least two target devices;
receiving port open/closed state information returned by the at least two target devices in response to the port open/closed state probe packet, wherein the port open/closed state information comprises port open/closed state vectors indicating whether each port of the at least two target devices is open or closed;
extracting a port open/closed state feature from the port open/closed state information;
starting from a root node of the decision tree classifier, performing the decision classification based on a feature attribute corresponding to the node in the port open/closed state feature until a leaf node of the decision tree classifier; and
determining a device type of each of the at least two target devices according to a result obtained from the decision classification.

A non-transitory computer-readable storage medium is provided, storing a computer program that, when executed by a processor of a computer device, causes the computer device to perform the following steps:
transmitting a port open/closed state probe packet to at least two target devices;
receiving port open/closed state information returned by the at least two target devices in response to the port open/closed state probe packet, wherein the port open/closed state information comprises port open/closed state vectors indicating whether each port of the at least two target devices is open or closed;

extracting a port open/closed state feature from the port open/closed state information;

starting from a root node of the decision tree classifier, performing the decision classification based on a feature attribute corresponding to the node in the port open/closed state feature until a leaf node of the decision tree classifier; and determining a device type of each of the at least two target devices according to a result obtained from the decision classification.

A computer program product or a computer program is provided, the computer program product or the computer program including computer instructions, the computer instructions being stored in a computer-readable storage medium. A processor of a computer device reads and executes the computer instructions from the computer-readable storage medium, to cause the computer device to perform the steps of the foregoing device type identification method.

Details of one or more embodiments of this application are provided in the accompanying drawings and descriptions below. Other features, objectives, and advantages of this application will become evident in the specification, drawings, and claims.

BRIEF DESCRIPTION OF THE DRAWINGS

To describe technical solutions in embodiments of this application more clearly, the following briefly introduces accompanying drawings required for describing the embodiments. Apparently, the accompanying drawings in the following description show merely some embodiments of this application, and a person of ordinary skill in the art may still derive other accompanying drawings according to the accompanying drawings without creative efforts.

DESCRIPTION OF EMBODIMENTS

To make objectives, technical solutions, and advantages of this application clearer and more comprehensible, this application is further described in detail with reference to the accompanying drawings and embodiments. It is to be understood that the specific embodiments described herein are only used for explaining this application, and are not used for limiting this application.

Figure 1:
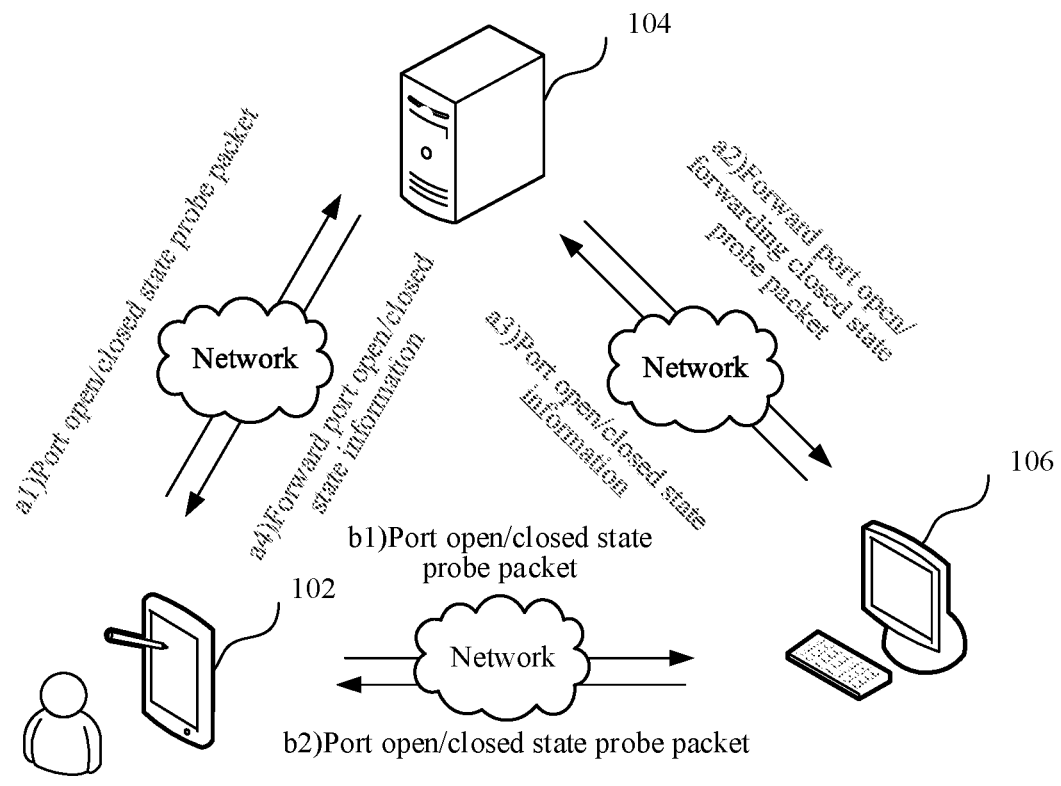
FIG. 1 is a diagram of an application environment of a device type identification method according to an embodiment.
Figure 1:
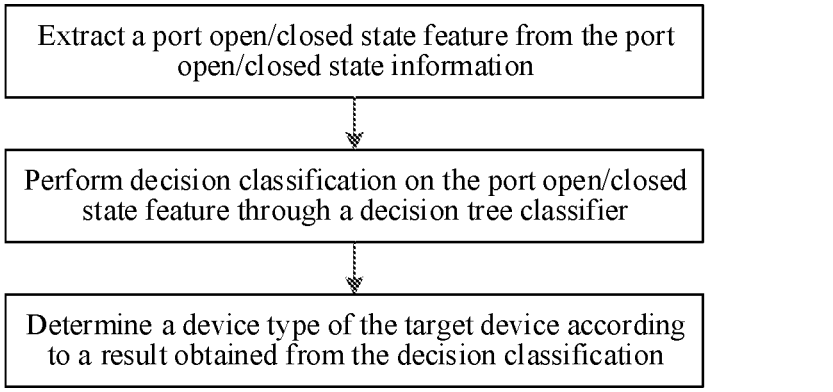

A device type identification method provided in this application can be applied in an application environment as shown in FIG. 1. In the application environment, a terminal 102, a server 104, and a target device 106 are included. The terminal 102 directly transmits a port open/closed state probe packet to the target device 106, or forwards the port open/closed state probe packet through the server 104, and then receives port open/closed state information returned by the target device 106 in response to the port open/closed state probe packet; extracts a port open/closed state feature from the port open/closed state information; performs decision classification on the port open/closed state feature through a decision tree classifier; and determines a device type of the target device 106 according to a result obtained from the decision classification.

The terminal 102 may be a smartphone, a tablet computer, a notebook computer, a desktop computer, a smart speaker, a smartwatch, or the like, but is not limited thereto.

The server 104 may be an independent physical server, or may also be a server cluster composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a big data and AI platform.

The target device 106 may be a terminal or server on a network side. The terminal may be a smartphone, a tablet computer, a notebook computer, a desktop computer, a smart speaker, a smart watch, a home appliance, or other Internet of Things (IoT) devices.

The terminal 102, the server 104, and the target device 106 can be connected through a communication connection mode such as Bluetooth, USB (Universal Serial Bus), or a network. This is not limited in this application.

Figure 2:
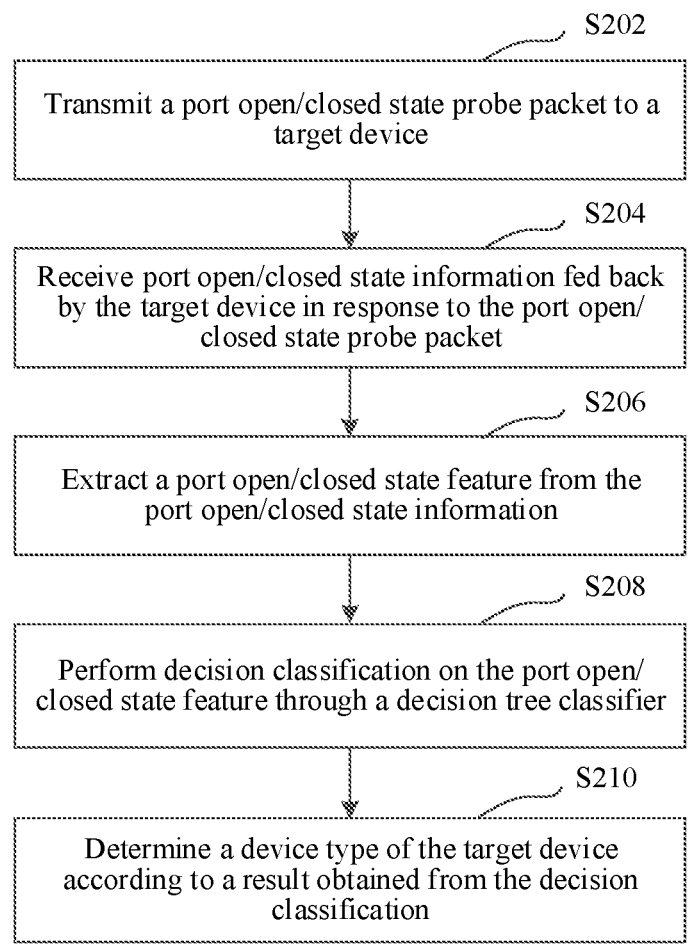
FIG. 2 is a schematic flowchart of a device type identification method according to an embodiment.

In an embodiment, as shown in FIG. 2, a device type identification method is provided in the figure. Using an example in which the method is applied to the terminal 102 shown in FIG. 1 to describe, the method includes the following steps:

S202. Transmit a port open/closed state probe packet to a target device.

The port open/closed state probe packet may be a probe packet constructed based on a target communication protocol and for accessing a port in the target device. In addition, the port open/closed state probe packet may be a probe packet generated based on the target communication protocol. The target communication protocol may be any one of UDP (User Datagram Protocol), TCP (Transmission Control Protocol), or another communication protocol. A port is an entry/exit port through which the target device communicates with an external terminal or server.

In an embodiment, the terminal may transmit the port open/closed state probe packet to a target device, may transmit the port open/closed state probe packet to a plurality of target devices at the same time, or may periodically transmit the port open/closed state probe packet to one or more target devices.

In an embodiment, the terminal transmits the port open/closed state probe packet to the target device, to instruct the target device to return port open/closed state information of a corresponding port to the terminal.

In an embodiment, the terminal generates a port open/closed state probe packet for probing a target port or all ports in the target device according to the target communication protocol; and transmits the port open/closed state probe packet to the target port or all ports of the target device respectively. The transmitted port open/closed state probe packet is used for instructing the target device to generate port open/closed state information of the target port or all ports and provide feedback.

Specifically, the terminal generates the port open/closed state probe packet for probing the target port in the target device according to the target communication protocol, so that the target device generates and returns the port open/closed state information of the target port; or the terminal generates the port open/closed state probe packet for probing each port of the target device according to the target communication protocol, so that the target device generates and returns the port open/closed state information of each port.

The terminal can transmit the port open/closed state probe packet to all ports of the target device, that is, a quantity of the transmitted port open/closed state probe packets is the same as a quantity of ports of the target device. In addition, the terminal may only transmit the port open/closed state probe packet to the target port of the target device, that is, the quantity of the transmitted port open/closed state probe packets is the same as the quantity of the target ports of the target device.

For example, the terminal generates the port open/closed state probe packet based on the UDP protocol, and the port open/closed state probe packet carries a port number. The terminal respectively transmits a port open/closed state probe packet to the target port or all ports of the target device. If a port receiving the port open/closed state probe packet is open, a corresponding port of the target device gives feedback when receiving the port open/closed state probe packet, that is, returns port open/closed state information to the terminal, or returns other feedback information corresponding to the port open/closed state probe packet as the port open/closed state information to the port. If the port receiving the port open/closed state probe packet is closed (that is, not open), the target device returns port open/closed state information that the port is not open to the terminal.

S204. Receive port open/closed state information returned by the target device in response to the port open/closed state probe packet.

The port open/closed state information may be used for indicating whether the port is open or not, and 01 may be used for indicating whether the port is open or not. For example, 0 indicates that the port is closed (that is, not open), and 1 indicates that the port is open.

In an embodiment, when receiving the port open/closed state probe packet from the terminal, the target device returns the port open/closed state information whether a corresponding port is open or closed to the terminal. For example, when the port of the target device is open, the target device returns the port open/closed state information that the corresponding port is open. When the port of the target device is closed (that is, not open), the target device returns the port open/closed state information that the corresponding port is closed.

In another embodiment, if the port of the target device is open, when receiving the port open/closed state probe packet of the terminal, the target device can give feedback and return the port open/closed state information that the corresponding port is open to the terminal. When the port of the target device is closed, the target device does not give feedback, that is, does not feedback information to the terminal. Therefore, the terminal can determine whether the port is open or not according to whether or not the terminal receives the port open/closed state information returned by the target device, to obtain port open/closed state information of each port of the target device. Therefore, regardless of whether or not the port of the target device is open, it is only necessary to transmit a port open/closed state probe packet based on a communication protocol. According to whether or not the feedback of the target device is received, the received feedback is used as the port open/closed state information, so that it is not necessary to try to transmit identity probe packets of various protocols and types to the target device to obtain a port identity, so as to determine a type of the target device according to the port identity, which can effectively reduce a quantity of the transmitted port open/closed state probe packet, and improve identification efficiency for the device type.

In an embodiment, after transmitting the port open/closed state probe packet to the target device, the terminal starts a timer for timing. If the port open/closed state information returned by the target device is not received within a specified timing duration, it can be determined that the corresponding port of the target device is not open, thereby obtaining the port open/closed state information that the port is not open. If the port open/closed state information returned by the target device is received within the specified timing duration, it can be determined that the corresponding port of the target device is open, thereby obtaining the port open/closed state information that the port is open.

S206. Extract a port open/closed state feature from the port open/closed state information.

The port open/closed state feature may be a state feature extracted from the port open/closed state information and having a decreased dimension. For example, the port open/closed state information is an n-dimensional vector, and the port open/closed state feature is a k-dimensional port open/closed state feature extracted from the port open/closed state information. n is greater than k, and both n and k are positive integers.

In an embodiment, S206 may specifically include: The terminal performs dimension reduction processing on the port open/closed state information, to obtain the port open/closed state feature. For example, redundant data in the port open/closed state information is removed, to obtain the port open/closed state feature; or, dimension reduction is performed in other manners.

In an embodiment, when the port open/closed state information includes port open/closed state vectors indicating whether each port of at least two target devices is open or closed, S206 may specifically include: The terminal composes the port open/closed state vectors of the at least two target devices into a port state matrix; determines a mean of data in each row or column of the port state matrix; calculates a difference between the data in each row or column of the port state matrix and a corresponding mean, to obtain a difference matrix; determines an eigenvalue of the difference matrix and an eigenvector corresponding to the eigenvalue; and extracts a sub-eigenmatrix from an eigenmatrix composed based on the eigenvector according to a target dimension, and uses the sub-eigenmatrix as the port open/closed state feature.

The difference may be a difference between data in the port state matrix and a corresponding mean, or a variance calculated according to the data in the port state matrix and the corresponding mean.

Specifically, the terminal composes the port open/closed state information of the at least two target devices into a port state matrix by column; and determines a mean of data in each row of the port state matrix. Alternatively, the terminal composes the port open/closed state information of the at least two target devices into a port state matrix by row; and determines a mean of data in each column of the port state matrix.

In an embodiment, the foregoing step of extracting a sub-eigenmatrix from an eigenmatrix composed based on the eigenvector according to a target dimension may specifically include: The terminal arranges the eigenvectors according to an order of values of the eigenvalues, to obtain the eigenmatrix; and extracts a sub-eigenmatrix of the target dimension from the eigenmatrix in descending order of the eigenvalues.

The target dimension is less than a dimension of the port state matrix. For example, the dimension of the port state matrix is n, and a corresponding target dimension is k (k is less than n, and both k and n are positive integers).

For example, assuming that there are m target devices, and a quantity of ports to be probed by each target device is n. Each target device can obtain a piece of n-dimensional port open/closed state information (that is, a port open/closed state vector), and m target devices obtain m pieces of n-dimensional port open/closed state information. An n×m port state matrix X is composed of each piece of port open/closed state information by column, and the following describes the port state matrix X:

$$X = \begin{bmatrix} x_{11} & \cdots & x_{1m} \\ \vdots & \ddots & \vdots \\ x_{n1} & \cdots & x_{nm} \end{bmatrix}$$

Let $C=1/m\ XX^T$, then C is a positive semi-definite symmetric matrix ($\varepsilon C \varepsilon^T \geq 0$). Data on a diagonal of the matrix C is a variance of data in each row of the port state matrix X (that is, the matrix C is a variance matrix), and $C_{i,j}=C_{j,i}$ respectively represents covariances of two features i, j. Let P be a matrix composed of a set of bases by row, and Y be data after the matrix P performs a change of basis on the port state matrix X (that is, dimension-reduced data), then there is Y=PX.

$$C=1/mXX^T=1/m(PX)(PX)^T=P(1/mXX^T)P^T=PCP^T$$

Therefore, extracting a port eigenmatrix is transformed into searching for a matrix P, which makes $PCP^T$ be a diagonal matrix, and row data in the matrix P is arranged according to a size of eigenvalues (such as arranging in descending order). Then first k rows of the diagonal matrix P are bases searched for. A matrix composed of the first k rows of P is multiplied by the port state matrix X, so that the port state matrix X is reduced from n-dimension to k-dimension, to obtain a k-dimensional port open/closed state feature. The eigenvalue is an eigenvalue of a matrix P, and the matrix P is a matrix composed of an eigenvector corresponding to the matrix C.

In an embodiment, in a process of extracting the port open/closed state feature from the port state matrix, the terminal may use a maximum projection variance method to make a variance of each vector in the port state matrix be maximum. Projection in a direction with a largest variance can maximize difference of data, so that more port open/closed state information can be preserved.

In an embodiment, the terminal decentralizes the port open/closed state information, to obtain target port open/closed state information, and then composes a target port open/closed state vector of each target device into a port state matrix by row or column. A mean of the target port open/closed state information is zero. In this case, because the mean is zero, the variance of each vector in the port state matrix is largest.

For example, a port state matrix $X \in R^n$ is a set of n-dimensional port open/closed state vectors, the port open/closed state vector $x^{(i)} \in X$, and a projection vector $u \in R^d$. A length of u is limited to 1, that is, $u^T u=1$. The port open/closed state vector $x^{(i)}$ is decentralized, to obtain the decentralized eigenvector $z^{(i)}$. A mean of each feature component of the eigenvector $z^{(i)}$ is 0, and a variance of a port state matrix X after projection is:

$$\sigma(X, u) = \frac{1}{m}\sum_{i=1}^{m}[(z^{(i)})^T u - 0]^2 = \frac{1}{m}\sum_{i=1}^{m}[(z^{(i)})^T u]^T (z^{(i)})^T u = \frac{1}{m}\sum_{i=1}^{m} u^T z^{(i)}(z^{(i)})^T u = u^T S u$$

Therefore, an optimization function is:

$$_u{}^{argmax}(u^T S u)$$

$$u^T u = 1$$

The function is converted into an unconstrained problem by a Lagrangian method, where λ is a Lagrange multiplier:

$$_u{}^{argmax}(u^T S u) + \lambda(1 - u^T u)$$

Derivation is performed on the foregoing formula, the following can be obtained:

$$Su = \lambda u$$

It can be known from the foregoing formula that u is an eigenvector of a covariance matrix S, and λ is an eigenvalue. In this case, there is:

$$\sigma(X,u) = u^T S u = u^T \lambda u = \lambda$$

λ is also a variance of a sample after projection. Therefore, a projection vector u is an eigenvector corresponding to an eigenvalue λ of the port state matrix. These eigenvectors are arranged in descending order of eigenvalues λ, and then first k-dimensional sub-matrix is selected. The k-dimensional sub-matrix is the port open/closed state feature.

As an example, if ports of n target devices numbered from 0 to 65535 are probed, the terminal may transmit 65536×n port open/closed state probe packets to the target device, and receive 65536×n pieces of port open/closed state information returned by the target device. The 65536×n pieces of port open/closed state information are combined into a port state matrix by column, and a port open/closed state feature corresponding to the port state matrix is obtained based on the maximum projection variance method.

S208. Perform decision classification on the port open/closed state feature through a decision tree classifier.

The decision tree classifier may refer to a classification model constructed based on a decision tree. The decision classification may be performed on the port open/closed state feature through the decision tree classifier.

In an embodiment, the port open/closed state feature is inputted to the decision tree classifier, and the decision classification is performed on the port open/closed state feature through each node in the decision tree classifier.

In an embodiment, when the port open/closed state feature is inputted to the decision tree classifier, starting from a root node of the decision tree classifier, at a node passed, the decision classification is performed based on a feature attribute corresponding to the node in the port open/closed state feature until a leaf node of the decision tree classifier.

Figure 3:
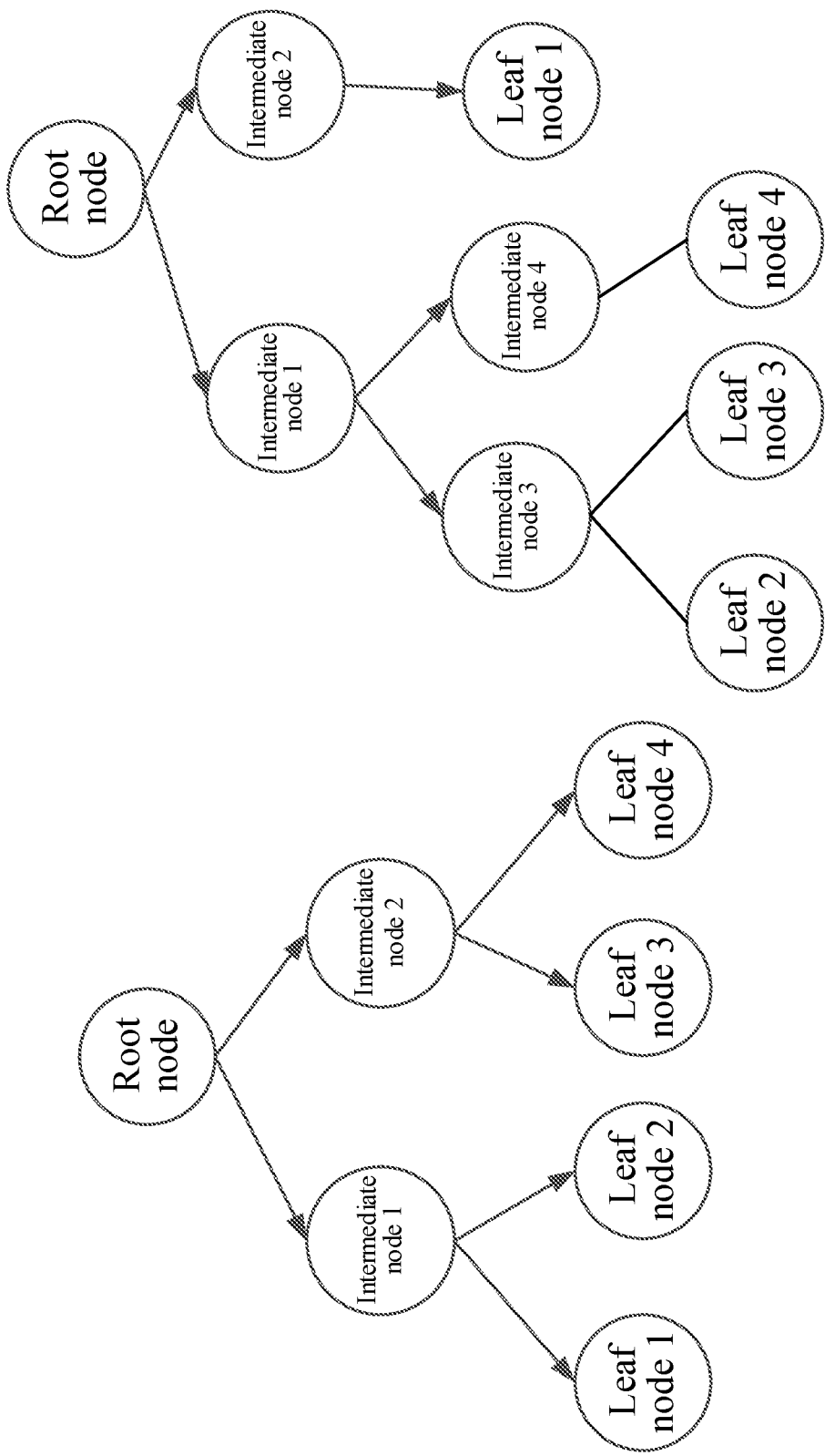
FIG. 3 is a schematic structural diagram of each node in a decision tree classifier according to an embodiment.

The decision tree classifier includes the root node, the leaf node, and an intermediate node of at least one layer. The intermediate node may refer to a node having a parent node (which may be a root node or an intermediate node at a previous layer) and a child node (which may be a leaf node or an intermediate node at a next layer). As shown in FIG. 3, a left diagram of FIG. 3 includes intermediate nodes at one layer, and a right diagram includes intermediate nodes at two layers.

The node may be a condition determining node used for representing whether a corresponding port of the target device is open or not. If the corresponding port of the target device is determined to be open based on the port open/closed state feature at a certain node, an output branch of the port open/closed state feature at the node is selected. If the corresponding port of the target device is determined to be closed based on the port open/closed state feature at a certain node, another output branch of the port open/closed state feature at the node is selected.

The feature attribute may be an attribute used for representing whether the corresponding port of the target device is open or closed, and the feature attribute is included in the port open/closed state feature. For example, if the port open/closed state feature is $$\begin{bmatrix} 1 & 0 \\ 0 & 0 \end{bmatrix},$$

the feature attribute of the port open/closed state feature may be that a port 1 is open and a port 2 is closed.

In an embodiment, the terminal inputs the port open/closed state feature to the decision tree classifier; determines a first output branch outputted by the port open/closed state feature at the root node of the decision tree classifier based on a feature attribute corresponding to the root node in the port open/closed state feature; determines a second output branch at an intermediate node corresponding to the first output branch, based on a feature attribute corresponding to the intermediate node in the port open/closed state feature; and transfers the port open/closed state feature from the intermediate node to a corresponding leaf node according to the second output branch.

Figure 4A:
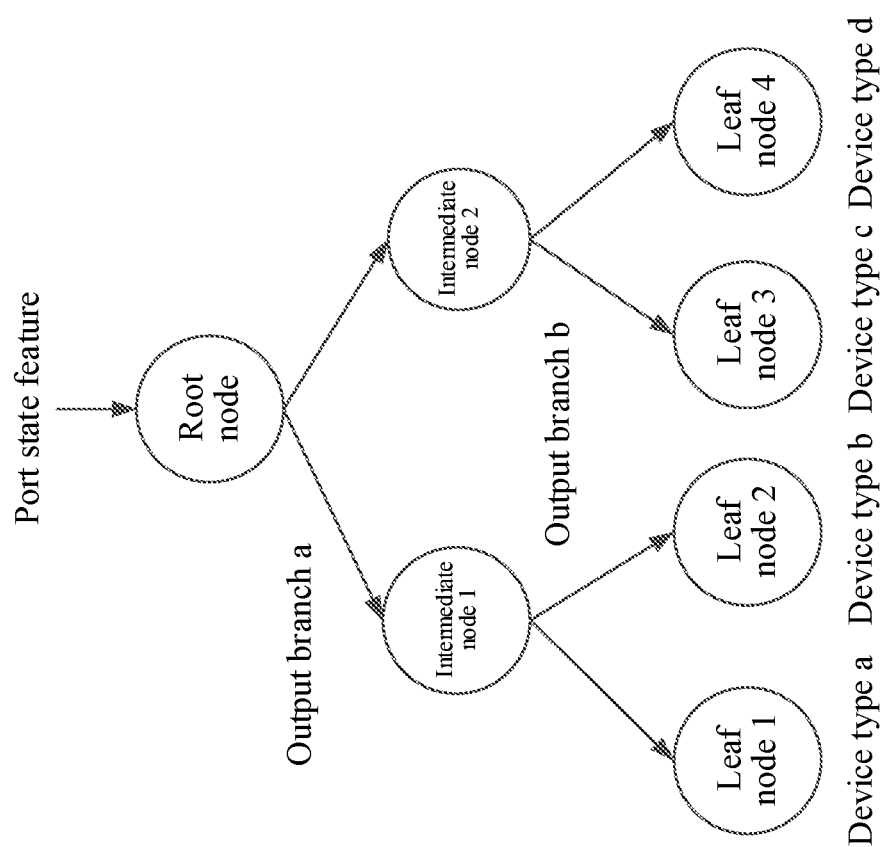
FIG. 4a is a schematic flowchart of performing decision classification on a port open/closed state feature through a node according to an embodiment.

For example, as shown in FIG. 4a, after the port open/closed state feature is inputted to the decision tree classifier, an output branch a of the port open/closed state feature at the root node of the decision tree classifier is determined based on a feature attribute corresponding to the root node in the port open/closed state feature. Then, the port open/closed state feature flows to an intermediate node 1 through the output branch a, and at the intermediate node 1, an output branch b is determined based on a feature attribute corresponding to the intermediate node 1 in the port open/closed state feature. The port open/closed state feature is transferred from the intermediate node to a corresponding leaf node 2 according to the output branch b.

In another embodiment, the terminal inputs the port open/closed state feature to the decision tree classifier; determines a first value of the port open/closed state feature under a determining condition corresponding to the root node and a first output branch of the first value; and determines a second value of the port open/closed state feature under a determining condition corresponding to the intermediate node and a second output branch of the second value at an intermediate node corresponding to the first output branch.

Figure 4B:
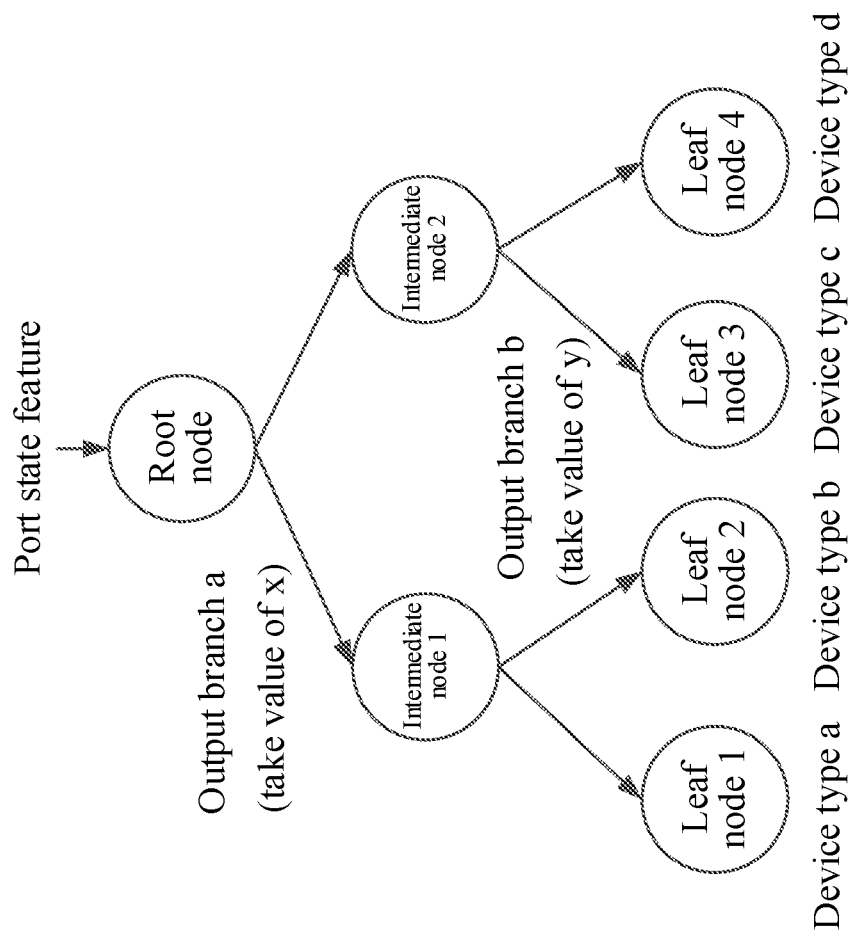
FIG. 4b is a schematic flowchart of performing decision classification on a port open/closed state feature through a node according to another embodiment.

For example, as shown in FIG. 4b, after the port open/closed state feature is inputted to the decision tree classifier, a value x of the port open/closed state feature under the determining condition corresponding to the root node and an output branch a of the value x are determined. At an intermediate node 1 corresponding to the output branch a, a value y of the port open/closed state feature under the determining condition corresponding to the intermediate node 1 and an output branch b of the value y are determined. A corresponding leaf node 2 is determined according to the output branch b, and the value y is transferred to the leaf node 2.

S210. Determine a device type of the target device according to a result obtained from the decision classification.

In an embodiment, the device type is saved in the leaf node. S210 may specifically include: The terminal reads the device type saved in the leaf node when the port open/closed state feature is transferred to the corresponding leaf node; and uses the read device type as the device type of the target device.

For example, as shown in FIG. 4a, when the port open/closed state feature is transferred from the intermediate node to the corresponding leaf node 2, because a type saved by the leaf node 2 is identified as a device type b, a type of the target device can be determined as the device type b through the device type b saved by the leaf node 2.

In another embodiment, the device type is saved in the leaf node. S210 may specifically include: The terminal determines a corresponding leaf node according to the second output branch, and transfers the second value to the leaf node; and reads the device type saved by the leaf node, and uses the read device type as the device type of the target device.

For example, as shown in 4b, when a corresponding leaf node 2 is determined according to the output branch b, the value y is transferred to the leaf node 2. The device type b saved by the leaf node 2 is read, and the read device type b is used as the device type of the target device.

In an embodiment, when determining the type of the target device, the terminal obtains an IP (Internet Protocol) address and/or a physical address of the target device, so as to, when the target device is determined to be a risk device according to the type, isolate a data packet when the data packet includes the IP address of the risk device, and refuse to respond to data interaction or data processing corresponding to the data packet. For example, when the target device is determined as a device that specifically transmits advertising email or virus email, the advertising email or virus email transmitted by the target device can be separated, such as placed in a spam email in a mailbox.

In another embodiment, a network request is generated when the target device is determined as a risk device according to the device type; and the generated network request is transmitted to the target device determined as the risk device, to cause the target device to stop service.

Specifically, when the target device is determined as the risk device according to the type, the terminal continuously transmits the network request to the target device by using methods of DDoS (Distributed Denial of Service) or CC (Challenge Collapsar), so that the target device exhausts a broadband resource and/or exhausts a device resource, to avoid being attacked by the target device, and to prevent another terminal or server from being attacked by the target device.

In the foregoing embodiment, when identification of the device type is performed on the target device, port open/closed state information returned by the target device can be obtained by transmitting the port open/closed state probe packet to the target device. Therefore, even if the port identity of the target device is erased, obtaining of the port open/closed state information is not affected. In addition, the port open/closed state feature is extracted from the port open/closed state information, decision classification is performed on the port open/closed state feature by the decision tree classifier, and the device type of the target device is determined according to a result obtained by the decision classification. Therefore, it only needs the port open/closed state information of the target device to obtain the device type of the target device by using the decision tree classifier, which avoids a problem that the device type of the target device cannot be accurately identified because the target device erases the port identity.

Figure 5:
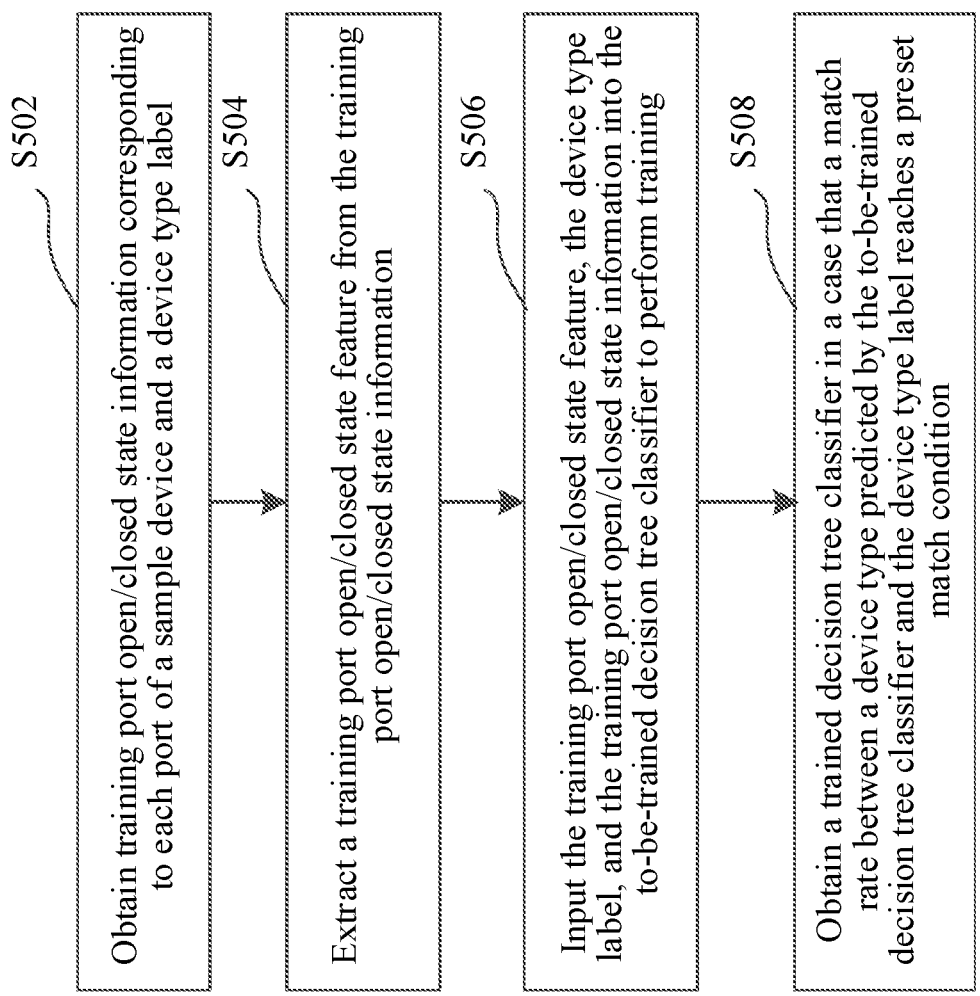
FIG. 5 is a schematic flowchart of steps of model training according to an embodiment.

In an embodiment, as shown in FIG. 5, steps of the model training include:

S502. Obtain training port open/closed state information corresponding to each port of a sample device and a device type label.

The sample device may be at least two devices whose device types are determined, specifically Internet of Things devices (such as home appliances) or other types of devices. The training port open/closed state information may be port open/closed state information of each port of the sample device and for model training. The port open/closed state information may be used for indicating whether the port is open or not, that is, the port open/closed state information may be used for indicating a port open/closed state. In the embodiments of this application, 01 may be used for indicating whether the port is open or not. For example, 0 indicates that the port is closed (that is, not open), and 1 indicates that the port is open. The device type label may be a label used for identifying the device type.

The sample device includes a risk device and a non-risk device. Correspondingly, port open/closed state information corresponding to the risk device belongs to a negative sample, and port open/closed state information corresponding to the non-risk device belongs to a positive sample.

In an embodiment, the terminal may transmit the port open/closed state probe packet to one sample device, may transmit the port open/closed state probe packet to a plurality of sample devices at the same time, or may periodically transmit the port open/closed state probe packet to one or more sample devices, to obtain training port open/closed state information of one or more sample devices.

In an embodiment, the terminal transmits the port open/closed state probe packet to the sample device, and instructs the sample device to return training port open/closed state information of a corresponding port to the terminal, so that the terminal obtains the training port open/closed state information of the sample device. The port open/closed state probe packet may be a probe packet generated based on a target communication protocol. The target communication protocol may be any one of UDP, TCP, or another communication protocol.

In an embodiment, the terminal generates the port open/closed state probe packet for probing the target port in the sample device according to the target communication protocol, so that the sample device generates and returns the training port open/closed state information of the target port; or the terminal generates the port open/closed state probe packet for probing each port of the sample device according to the target communication protocol, so that the sample device generates and returns the training port open/closed state information of each port.

The terminal can transmit the port open/closed state probe packet to all ports of the sample device, that is, a quantity of the transmitted port open/closed state probe packets is the same as a quantity of ports of the sample device. In addition, the terminal may only transmit the port open/closed state probe packet to the target port of the sample device, that is, the quantity of the transmitted port open/closed state probe packets is the same as the quantity of the target ports of the sample device.

For example, the terminal generates the port open/closed state probe packet based on the UDP protocol, and the port open/closed state probe packet carries a port number. The terminal respectively transmits a port open/closed state probe packet to the target port or all ports of the sample device. If a port receiving the port open/closed state probe packet is open, the port gives corresponding feedback when receiving the port open/closed state probe packet, that is, returns training port open/closed state information to the terminal, or returns other feedback information corresponding to the port open/closed state probe packet as the training port open/closed state information to the port. If the port receiving the port open/closed state probe packet is closed (that is, not open), the terminal receives training port open/closed state information that the port is not open transmitted by the sample device.

In another embodiment, if the port of the sample device is open, when receiving the port open/closed state probe packet of the terminal, the sample device can give feedback and return training port open/closed state information of a corresponding port to the terminal. When the port of the sample device is closed, the sample device does not give feedback, that is, does not give feedback to the terminal. Therefore, the terminal can determine whether the port is open or not according to whether or not the terminal receives the training port open/closed state information returned by the sample device, to obtain training port open/closed state information of each port of the sample device.

In an embodiment, after transmitting the port open/closed state probe packet to the sample device, the terminal starts a timer. If the training port open/closed state information returned by the sample device is not received within a timing duration of the timer, it can be determined that the corresponding port of the sample device is not open, thereby obtaining the training port open/closed state information that the port is not open. If the training port open/closed state information returned by the sample device is received within the timing duration of the timer, it can be determined that the corresponding port of the sample device is open, thereby obtaining the training port open/closed state information that the port is open.

S504. Extract a training port open/closed state feature from the training port open/closed state information.

In an embodiment, the training port open/closed state information is training port open/closed state vectors indicating whether each port of at least two target devices is open or closed. S504 may specifically include: The terminal composes the training port open/closed state vectors of each sample device into a training port state matrix; determines a mean of data in each row or column of the training port state matrix; calculates a training difference between the data in each row or column of the training port state matrix and a corresponding mean, to obtain a training difference matrix;

determines a training eigenvalue of the training difference matrix and a corresponding training eigenvector; extracts a sub-eigenmatrix according to the target dimension from a training eigenmatrix composed based on the training eigenvector; and uses the sub-eigenmatrix as the training port open/closed state feature.

In an embodiment, the foregoing step of extracting a sub-eigenmatrix according to the target dimension from a training eigenmatrix composed based on the training eigenvector may specifically include: arranging the training eigenvectors according to an order of values of the training eigenvalues, to obtain the training eigenmatrix; and extracting a sub-eigenmatrix of the target dimension from the training eigenmatrix composed based on the training eigenvector in descending order of the training eigenvalues.

The foregoing step of extracting a training port open/closed state feature from the training port open/closed state information may specifically refer to S206 in the foregoing embodiment.

S506. Input the training port open/closed state feature, the device type label, and the training port open/closed state information into the to-be-trained decision tree classifier to perform training.

The training port open/closed state feature refers to a feature extracted from the training port open/closed state information, and a dimension of the training port open/closed state feature is smaller than that of the training port open/closed state information. In addition, an open/closed state of a response port in the sample device may also be determined through the training port open/closed state feature.

In an embodiment, S506 may specifically include: The terminal inputs the training port open/closed state feature, the device type label, and the training port open/closed state information into the to-be-trained decision tree classifier; uses the training port open/closed state information as an attribute set, and selects a target attribute from the attribute set; generates a target branch at a target node corresponding to the target attribute, and determines an output value of the port open/closed state feature under the target branch of the target node; and marks a node on a next layer connected through the target branch as a leaf node when the output value reaches a leaf node condition.

The leaf node condition may refer to a case that the output value is an empty set. Correspondingly, when the output value is the empty set, it indicates that the output value reaches the leaf node condition.

In an embodiment, the foregoing step of selecting a target attribute from the attribute set may specifically include: The terminal selects the target attribute from the attribute set based on a Gini index or information gain.

S508. Obtain a trained decision tree classifier when a match rate between a device type predicted by the to-be-trained decision tree classifier and the device type label reaches a preset match condition.

For example, when the match rate between the predicted device type and the device type label reaches a %, a being 100 or 99, or other numerical values, a trained to-be-trained decision tree classifier is used as a final decision tree classifier. This is not specifically limited in this embodiment.

In the foregoing embodiment, the to-be-trained decision tree classifier is trained by using the training port open/closed state information, the training port open/closed state feature, and the device type label corresponding to each port of the sample device, to obtain the trained decision tree classifier, and the decision tree classifier performs decision classification based on the port open/closed state feature corresponding to the port open/closed state information to obtain the device type. Therefore, it only needs the port open/closed state information of the target device to obtain the device type of the target device by using the decision tree classifier, which avoids a problem that the device type of the target device cannot be accurately identified because the target device erases the port identity.

Figure 6:
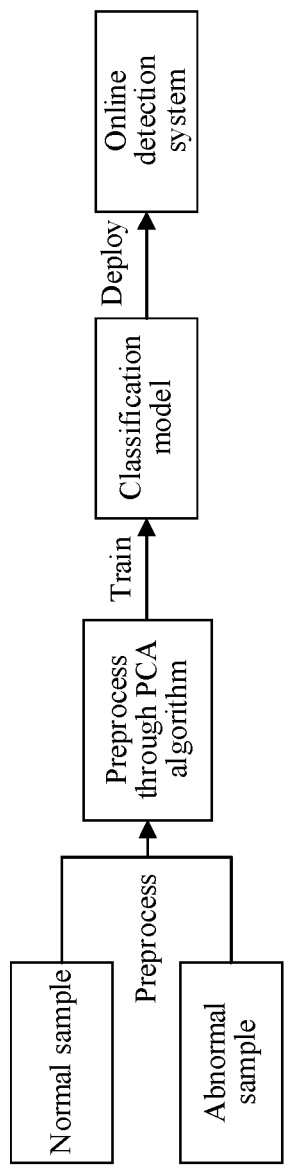
FIG. 6 is a schematic flowchart of a decision tree classifier after model training and deployment training according to an embodiment.

As an example, the device type identification method can be used for identifying whether a target identifier (the target identifier is a to-be-identified device) is an IoT device. As shown in FIG. 6, a main identifying process includes:

(1) Obtaining a Training Sample.

A step of obtaining the training sample (including a positive sample and a negative sample) includes: transmitting a probe packet based on the UDP protocol to the sample device, to probe whether ports distributed from 0 to 65535 are open or not, obtaining port open/closed state information returned by each sample device for model training, and respectively composing the port open/closed state information returned by each sample device to a port open/closed state vector for indicating a port state.

(2) Using PCA (Principal Component Analysis) Algorithm for Preprocessing.

Considering factors such as resource optimization and model efficiency together, the PCA algorithm is used for preprocessing the port open/closed state information, to obtain a port open/closed state feature after dimension reduction.

(3) Training of the Decision Tree Classifier.

The preprocessed port open/closed state feature is inputted to a to-be-trained decision tree classifier for training. When output of the decision tree classifier converges, a trained decision tree classifier is obtained.

(4) Deploying the Trained Decision Tree Classifier to a Detection System for Online Identification.

In a process of testing or actual application, if it is necessary to identify a device type of a to-be-identified target device, a decision tree classifier deployed in the detection system can be called to identify, to determine whether the target device is an IoT device.

In this and subsequent examples, during model training, the training sample (that is, a port open/closed state vector used for model training) is obtained from the sample device. The port open/closed state vector is obtained from the to-be-identified target device during testing or application. The port open/closed state vector may be vectorized port open/closed state information.

Figure 7:
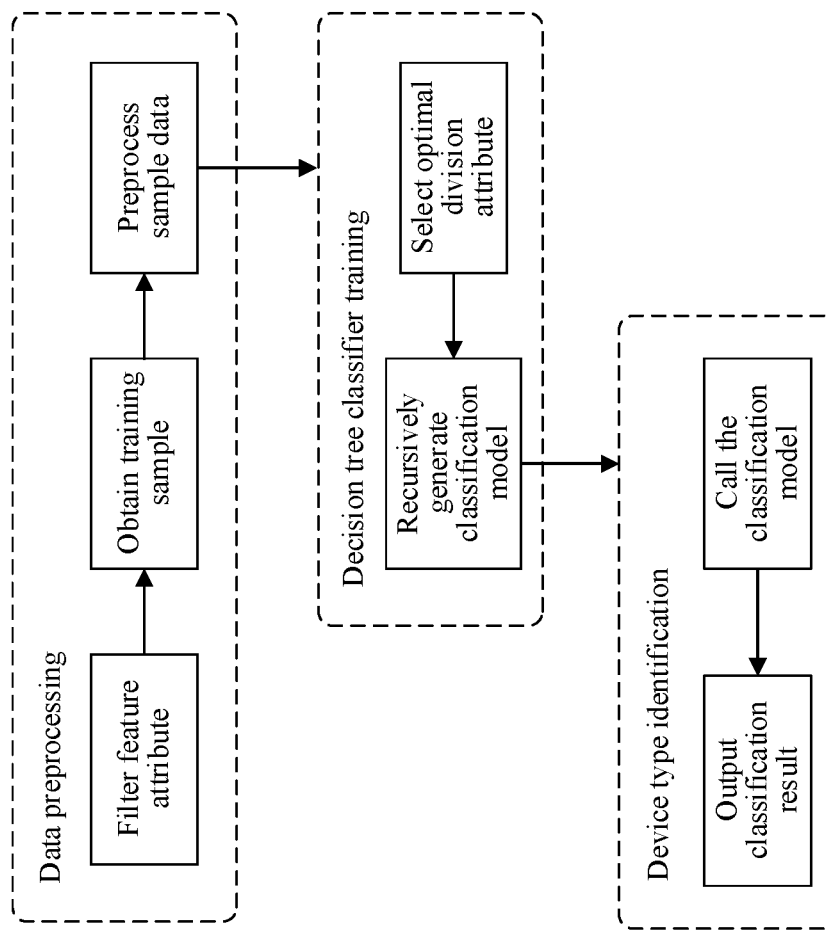
FIG. 7 is a schematic flowchart of model training and using a trained decision tree classifier to perform device type identification according to an embodiment.

As another example, the device type identification method may be used for identifying whether the target identifier is the IoT device. As shown in FIG. 7, the following three parts are described: data preprocessing, decision tree classifier training, and device type identification.

(1) Data Preprocessing

It is probed whether the port of the sample device is open. If a quantity of ports is n, port open/closed states distributed from 0 to n−1 (such as 0 to 65535) can be probed. If the port is open, the port is identified as 1, otherwise identified as 0, so as to obtain a port open/closed state vector. The port open/closed state vector is a vector with a length of 65536 and composed of 0/1.

Among the port open/closed state vectors, 1 usually only appears in a few bits of data, while a large amount of data is 0, which results in several problems: waste of a large amount of storage space, large increase in model computing consumption, and low model learning efficiency due to information dispersion. Therefore, it is necessary to preprocess the port open/closed state vector. In this embodiment, the PCA algorithm is used for performing dimension reduction, and a port open/closed state vector with a length of n dimensions is reduced to a port open/closed state vector with a length of k dimensions. For example, a port open/closed state vector with a length of 65535 dimensions is compressed to a port open/closed state vector with a length of 200 dimensions.

(a) Introduction of PCA Algorithm

A high-dimensional vector that may have correlation can be converted into a linearly independent low-dimensional vector by using the PCA algorithm, and the new low-dimensional vector preserves information of the original high-dimensional vector as much as possible. By converting the high-dimensional vector to the low-dimensional vector, the following problems may be solved:

1. Dimension reduction can alleviate a dimensional disaster problem.
2. Dimension reduction can minimize information loss during data compressing.
3. The low-dimensional vector is easier to understand through visualization, and a data structure of the high-dimensional vector is difficult to understand.

Optimization goal of the PCA algorithm: A set of n-dimensional vectors is reduced to k-dimensional vectors ($0<k<n$). The goal is to select k units of orthogonal basis, so that after original each port open/closed state vector is transformed to the orthogonal basis, a k-dimensional port open/closed state vector is obtained. A covariance between each two pieces of data in the k-dimensional port open/closed state vector is 0. A variance of the data is as large as possible, and largest k variances are taken under an orthogonal constraint.

Assuming that there are m n-dimensional port open/closed state vectors, which are arranged into an n×m matrix X (that is, the port state matrix in the foregoing embodiments). Let $C=1/m\ XX^T$, then C is a positive semi-definite symmetric matrix ($\epsilon C\epsilon^T \geq 0$). Data on a diagonal of the matrix C is a variance of data in each row of the port state matrix X (that is, the matrix C is a variance matrix), and $C_{i,j}=C_{j,i}$ respectively represents covariances of two features i, j. Let P be a matrix composed of a set of bases by row, and Y be data after the matrix P performs a change of basis on the port state matrix X (that is, dimension-reduced data), then there is Y=PX.

$$C=1/mXX^T=1/m(PX)(PX)^T=P(1/mXX^T)P^T=PCP^T$$

Therefore, an original optimization goal is transformed into searching for a matrix P, which makes $PCP^T$ be a diagonal matrix, and row data in the matrix P is arranged according to a size of eigenvalues (such as arranging in descending order). Then first k rows of the diagonal matrix P are bases searched for. A matrix composed of the first k rows of P is multiplied by the port state matrix X, so that the port state matrix X is reduced from n-dimension to k-dimension, to obtain a k-dimensional port open/closed state feature. The eigenvalue is an eigenvalue of a matrix P, and the matrix P is a matrix composed of an eigenvector corresponding to the matrix C.

For a calculation method of a maximum variance, the maximum projection variance method may be used for maximizing a variance of data in a space after the projection. By selecting a direction in which the variance of the data is largest to perform projection, difference of the data can be maximized, so more original data information can be preserved.

Assuming that a matrix $X \in R^n$ is a set of n-dimensional port open/closed state vectors, the port open/closed state vector $x^{(i)} \in X$, a projection vector $u \in R^d$, and a length of the projection vector u is 1, that is, $u^T u=1$. The original port open/closed state vector $x^{(i)}$ is decentralized, to obtain an eigenvector $z^{(i)}$. A mean of each feature component of the eigenvector $z^{(i)}$ is 0, and a variance of a matrix X after projection is:

$$\sigma(X, u) = \frac{1}{m}\sum_{i=1}^{m}[(z^{(i)})^T u - 0]^2 = \frac{1}{m}\sum_{i=1}^{m}[(z^{(i)})^T u]^T (z^{(i)})^T u = \frac{1}{m}\sum_{i=1}^{m} u^T z^{(i)}(z^{(i)})^T u = u^T S u$$

Therefore, an optimization function is:

$$\underset{u}{argmax}(u^T S u)$$

$$s.t.\ u^T u=1$$

The function is converted into an unconstrained problem by a Lagrangian method, where λ is a Lagrange multiplier:

$$\underset{u}{argmax} u^T S u + \lambda(1-u^T u)$$

Derivation is performed on the foregoing formula, the following can be obtained:

$$Su=\lambda u$$

It can be known from the foregoing formula that u is an eigenvector of a covariance matrix S, and λ is an eigenvalue. In this case, there is:

$$\sigma(X,u)=u^T S u=u^T \lambda u=\lambda$$

λ is also a variance of a sample after projection. Therefore, a projection vector u is an eigenvector corresponding to an eigenvalue λ of the port state matrix. These eigenvectors are arranged in descending order of eigenvalues λ, and then first k-dimensional sub-matrix is selected. The k-dimensional sub-matrix is the port open/closed state feature after dimension reduction.

(b) Process of the PCA Algorithm

Assuming that there are m n-dimensional port open/closed state vectors, then:

1. compose original data into an n×m matrix X by column;
2. zero-mean each row of X, that is, subtract a mean of this row;
3. find a covariance matrix: $C=1/m\ XX^T$;
4. find an eigenvalue of the covariance matrix and a corresponding eigenvector;
5. arrange the eigenvectors according to a size of a corresponding eigenvalue from top to bottom by row to form a matrix, and use first k rows to form a matrix P; and
6. Y=PX is a port open/closed state feature obtained after a dimension thereof is reduced to k-dimension.

(2) Decision Tree Classifier Training

Properties are usually divided based on the information gain and the Gini index. After testing, it is found that the Gini index performs better. Therefore, the Gini index is selected as an optimal attribute division basis to recursively generate a decision tree classifier.

After performed with dimension reduction by using the PCA algorithm, the port open/closed state feature enters the decision tree classifier (that is, a decision tree model) for further processing. Based on a machine learning classification algorithm, the decision tree classifier may automatically learn a port distribution feature, to achieve good identification effect.

1) Decision Tree Classifier

A decision tree is a tree structure, on which each non-leaf node represents a test on a feature attribute, each branch represents output of this feature attribute on a corresponding attribute value, and each leaf node stores a device type. During testing or actual use, the decision tree classifier is used for performing a decision process. A corresponding feature attribute in a to-be-classified item (that is, the port open/closed state feature of the target device in the foregoing embodiments) starts to be tested from a root node, and an output branch is selected according to its value until the leaf node is reached, and a device type stored by the leaf node is used as a decision result.

A training purpose of the decision tree classifier is to obtain a decision tree with a high generalization capability, that is, a capability to process unseen examples. A basic process thereof is as follows:

```
Input: training set D = {(x₁, y₁),
(x₂, y₂), ... , (xₘ, yₘ)};
  attribute set A = {a₁, a₂, ... , a_d}
Process: function TreeGenerate(D, A)
 1. generate a node;
 2. if samples in D are all in the
same type C (that is, type C) then
 3. mark all nodes as leaf nodes in type C; return
 4. end if
 5. If A = ØOR the samples in D
have the same value on A then
 6. mark the node as a leaf node, and mark
a type thereof as a category with
a largest quantity of samples in D; return
 7. end if
 8. select an optimal division
attribute a_* from A;
 9. for each value a_*ᵛ in a_* do
 10. generate a branch for the node;
and D_v represents a sample subset
whose value is a_*ᵛ on a_* in D;
 11. if D_v is empty then
 12. mark a branch node as a leaf node,
and mark a type thereof as a category
with a largest quantity of samples in D; return
 13. else
 14. take TreeGenerate
(D_v, A\{a_*}) as a branch node
 15. end if
 16. end for
Output: a decision tree with node as a root node
```

$x_1 \sim x_m$ in a training set $\{(x_1, y_1), (x_2, y_2), \ldots, (x_m, y_m)\}$ refers to port open/closed state features of different sample devices 1~m and used for model training, and $y_1 \sim y_m$ is device type labels of the sample devices 1~m; and an attribute set A is used for indicating whether a port of the sample device is open.

(3) Device Type Identification

After model training is performed, a decision tree classifier with a capability to automatically determine a device type can be obtained.

A to-be-classified item is classified by using the decision tree classifier, and the to-be-classified item is inputted to the decision tree classifier. Through classification processing of the decision tree classifier, a mapping relationship between the to-be-classified item and the device type can be obtained.

Through solutions of the foregoing embodiments, the following technical effects may be obtained:

1) Efficiency for scanning the IoT device is significantly improved, and scanning time is reduced.
2) IoT identification accuracy is significantly improved, and a coverage scenario of IoT identification is improved.

It is to be understood that steps in flowcharts of FIG. 2 and FIG. 5 are displayed in sequence based on indication of arrows, but the steps are not necessarily performed in sequence based on a sequence indicated by the arrows. Unless clearly specified in this specification, there is no strict sequence limitation on the execution of the steps, and the steps may be performed in another sequence. Moreover, at least a part of the steps in FIG. 2 and FIG. 5 may include a plurality of steps or a plurality of stages. These steps or stages are not necessarily executed at the same time, but may be executed at different times. The order of execution of these steps or stages is not necessarily performed sequentially, but may be performed in turn or alternately with other steps or at least a part of steps or stages of other steps.

Figure 8:
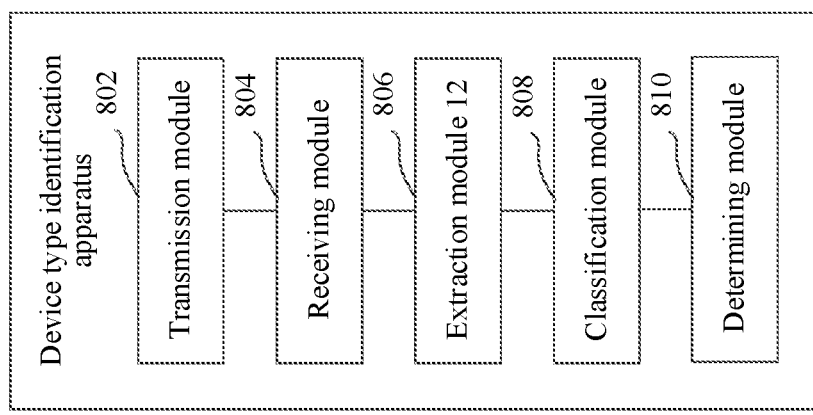
FIG. 8 is a structural block diagram of a device type identification apparatus according to an embodiment.

In an embodiment, as shown in FIG. 8, the figure provides a device type identification apparatus. The apparatus may be a software module or a hardware module, or a combination thereof as part of a computer device. The apparatus specifically includes a transmission module 802, a receiving module 804, an extraction module 806, a classification module 808, and a determining module 810.

The transmission module 802 is configured to transmit a port open/closed state probe packet to a target device.

The receiving module 804 is configured to receive port open/closed state information returned by the target device in response to the port open/closed state probe packet.

The extraction module 806 is configured to extract a port open/closed state feature from the port open/closed state information.

The classification module 808 is configured to perform decision classification on the port open/closed state feature through a decision tree classifier.

The determining module 810 is configured to determine a device type of the target device according to a result obtained from the decision classification.

In an embodiment, the port open/closed state information includes port open/closed state vectors indicating whether each port of at least two target devices is open or closed. The extraction module 806 is further configured to: compose the port open/closed state vectors of the at least two target devices into a port state matrix; determine a mean of data in each row or column of the port state matrix; calculate a difference between the data in each row or column of the port state matrix and a corresponding mean, to obtain a difference matrix; determine an eigenvalue of the difference matrix and an eigenvector corresponding to the eigenvalue; and extract a sub-eigenmatrix from an eigenmatrix composed based on the eigenvector according to a target dimension, and use the sub-eigenmatrix as the port open/closed state feature.

In an embodiment, the extraction module 806 is further configured to: arrange the eigenvectors according to an order of values of the eigenvalues, to obtain the eigenmatrix; and extract a sub-eigenmatrix of the target dimension from the eigenmatrix in descending order of the eigenvalues.

In an embodiment, the determining module 810 is further configured to, starting from a root node of the decision tree classifier, perform, at a node passed, the decision classification based on a feature attribute corresponding to the node in the port open/closed state feature until a leaf node of the decision tree classifier.

In an embodiment, the decision tree classifier includes the root node, the leaf node, and an intermediate node of at least one layer. The classification module 808 is further configured to: input the port open/closed state feature to the decision tree classifier; determine a first output branch outputted by the port open/closed state feature at the root node of the decision tree classifier based on a feature attribute corresponding to the root node in the port open/closed state feature; determine a second output branch at an intermediate node corresponding to the first output branch, based on a feature attribute corresponding to the intermediate node in the port open/closed state feature; and transfer the port open/closed state feature from the intermediate node to a corresponding leaf node according to the second output branch.

In an embodiment, the device type is saved in the leaf node. The determining module 810 is further configured to: read the device type saved in the leaf node when the port open/closed state feature is transferred to the corresponding leaf node; and use the read device type as the device type of the target device.

Figure 9:
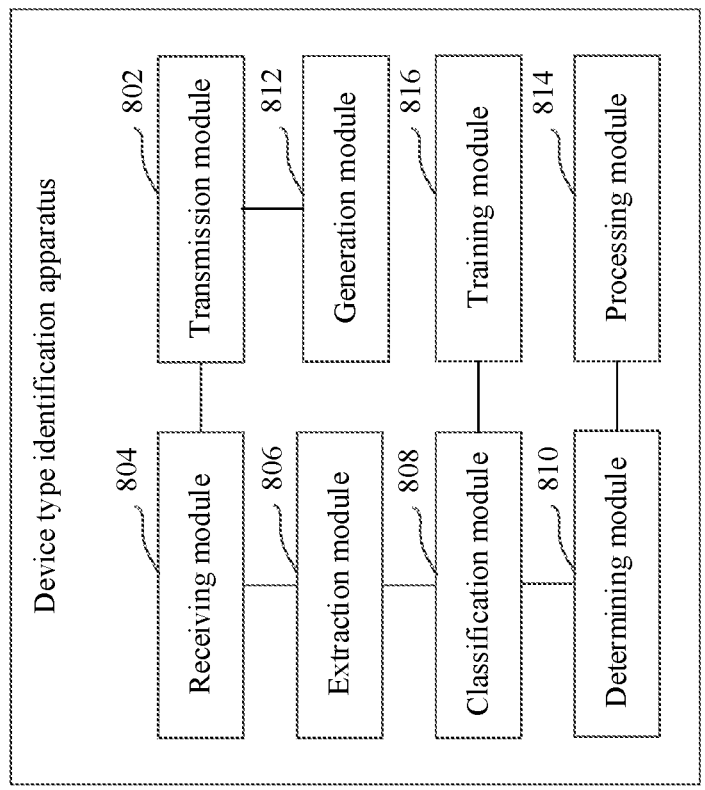
FIG. 9 is a structural block diagram of a device type identification apparatus according to another embodiment.

In an embodiment, as shown in FIG. 9, the apparatus further includes: a generation module 812.

The generation module 812 is configured to generate a port open/closed state probe packet for probing a target port or all ports in the target device according to the target communication protocol.

The transmission module 802 is configured to transmit the port open/closed state probe packet to the target port or all ports of the target device respectively. The transmitted port open/closed state probe packet is used for instructing the target device to generate port open/closed state information of the target port or all ports and provide feedback.

In the foregoing embodiment, when identification of the device type is performed on the target device, port open/closed state information returned by the target device can be obtained by transmitting the port open/closed state probe packet to the target device. Therefore, even if the port identity of the target device is erased, obtaining of the port open/closed state information is not affected. In addition, the port open/closed state feature is extracted from the port open/closed state information, decision classification is performed on the port open/closed state feature by the decision tree classifier, and the device type of the target device is determined according to a result obtained by the decision classification. Therefore, it only needs the port open/closed state information of the target device to obtain the device type of the target device by using the decision tree classifier, which avoids a problem that the device type cannot be accurately identified because the target device erases the port identity.

In an embodiment, as shown in FIG. 9, the apparatus further includes: a processing module 814.

The processing module 814 is configured to generate a network request when the target device is determined as a risk device according to the device type; and transmit the generated network request to the target device determined as the risk device continuously, to cause the target device to stop service.

In the foregoing embodiments, by continuously transmitting the network request to the target device determined as the risk device, a broadband resource and/or device resource of the target device may be exhausted, to cause the target device to stop service. Therefore, the terminal itself can be avoided from a security threat of the target device, and another terminal or server can also be avoided from the security threat of the target device, which improves security of information, the terminal, and the server.

In an embodiment, as shown in FIG. 9, the apparatus further includes: a training module 816.

The training module 816 is configured to obtain training port open/closed state information corresponding to each port of a sample device and a device type label; extract a training port open/closed state feature from the training port open/closed state information; input the training port open/closed state feature, the device type label, and the training port open/closed state information into the to-be-trained decision tree classifier to perform training; and obtain the decision tree classifier when a match rate between a device type predicted by the to-be-trained decision tree classifier and the device type label reaches a preset match condition.

In an embodiment, the training port open/closed state information is training port open/closed state vectors indicating whether each port of at least two target devices is open or closed. The training module 816 is further configured to:

compose the training port open/closed state vectors of each sample device into a training port state matrix;

determine a mean of data in each row or column of the training port state matrix;

calculate a training difference between the data in each row or column of the training port state matrix and a corresponding mean, to obtain a training difference matrix;

determine a training eigenvalue of the training difference matrix and a corresponding training eigenvector;

extract a sub-eigenmatrix according to the target dimension from a training eigenmatrix composed based on the training eigenvector; and use the sub-eigenmatrix as the training port open/closed state feature.

In an embodiment, the training module 816 is further configured to:

arrange the training eigenvectors according to an order of values of the training eigenvalues, to obtain the training eigenmatrix; and extract a sub-eigenmatrix of the target dimension from the training eigenmatrix composed based on the training eigenvector in descending order of the training eigenvalues.

In an embodiment, the training difference includes a covariance. The training module 816 is further configured to:

input the training port open/closed state feature, the device type label, and the training port open/closed state information into the to-be-trained decision tree classifier;

use the training port open/closed state information as an attribute set, and select a target attribute from the attribute set;

generate a target branch at a target node corresponding to the target attribute, and determine an output value of the port open/closed state feature under the target branch of the target node; and mark a node on a next layer connected through the target branch as a leaf node when the output value reaches a leaf node condition.

In an embodiment, the training module 816 is further configured to select the target attribute from the attribute set based on a Gini index or information gain.

In the foregoing embodiment, the to-be-trained decision tree classifier is trained by using the training port open/closed state information, the training port open/closed state feature, and the device type label corresponding to each port of the sample device, to obtain the trained decision tree classifier, and the decision tree classifier performs decision classification based on the port open/closed state feature corresponding to the port open/closed state information to obtain the device type. Therefore, it only needs the port open/closed state information of the target device to obtain the device type of the target device by using the decision tree classifier, which avoids a problem that the device type cannot be accurately identified because the target device erases the port identity.

For a specific limitation on the device type identification apparatus, reference may be made to the limitation on the device type identification method above. Details are not described herein again. The modules in the foregoing device type identification apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 10. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner. The wireless communication may be implemented by WIFI, an operator network, NFC (Near Field Communication), or other technologies. The computer program is executed by the processor to implement a device type identification method. The display screen of the computer device may be a liquid crystal display or an electronic ink display screen. The input device of the computer device may be a touch layer that overlays the display screen, or may be a key, a trackball, or a touchpad disposed on the chassis of the computer device, or may be an external keyboard, touchpad or mouse or the like.

Figure 10:
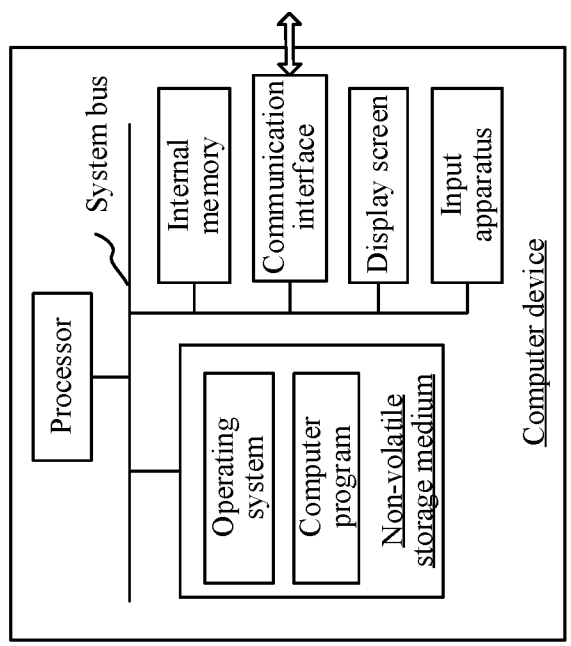
FIG. 10 is an internal structural diagram of a computer device in an embodiment.

A person skilled in the art may understand that, the structure shown in FIG. 10 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is further provided, including a memory and a processor, where the memory stores a computer program; and when executing the computer program, the processor performs the steps in the foregoing method embodiments.

In an embodiment, a computer-readable storage medium is provided, storing a computer program. The computer program, when executed by a processor, performs the steps of the foregoing method embodiments.

In an embodiment, a computer program product or a computer program is provided. The computer program product or the computer program includes a computer instruction. The computer instruction is stored in a computer-readable storage medium. The processor of the computer device reads the computer instruction from the computer-readable storage medium. The processor executes the computer instruction to cause the computer device to perform the steps of the method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments merely describe several implementations of this application. The description goes to details, but is in no way to be thereby understood as a limitation on the patent scope hereof. A person of ordinary skill in the art may further make several variations and improvements without departing from the ideas of this application, and such variations and improvements all fall within the protection scope of this application. Therefore, the protection scope of the patent of this application shall be subject to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A device type identification method performed by a computer device, the method comprising:
  transmitting a port open/closed state probe packet to at least two target devices;
  receiving port open/closed state information returned by the at least two target devices in response to the port open/closed state probe packet, wherein the port open/closed state information comprises port open/closed state vectors indicating whether each port of the at least two target devices is open or closed;
  composing the port open/closed state vectors of the at least two target devices into a port state matrix;
  determining a mean of data in each row or column of the port state matrix;
  calculating a difference between the data in each row or column of the port state matrix and a corresponding mean, to obtain a difference matrix;

determining an eigenvalue of the difference matrix and an eigenvector corresponding to the eigenvalue;

extracting a sub-eigenmatrix from an eigenmatrix composed based on the eigenvector according to a target dimension, and using the sub-eigenmatrix as the port open/closed state feature;

performing decision classification on the port open/closed state feature through a decision tree classifier; and determining a device type of each of the at least two target devices according to a result obtained from the decision classification.

2. The method according to claim 1, wherein the extracting a sub-eigenmatrix from an eigenmatrix composed based on the eigenvector according to a target dimension comprises:

arranging the eigenvectors according to an order of values of the eigenvalues, to obtain the eigenmatrix; and extracting a sub-eigenmatrix of the target dimension from the eigenmatrix in descending order of the eigenvalues.

3. The method according to claim 1, wherein the performing decision classification on the port open/closed state feature through a decision tree classifier comprises:

starting from a root node of the decision tree classifier, performing the decision classification based on a feature attribute corresponding to the node in the port open/closed state feature until a leaf node of the decision tree classifier.

4. The method according to claim 3, wherein the decision tree classifier comprises the root node, the leaf node, and an intermediate node of at least one layer; and the starting from a root node of the decision tree classifier, performing the decision classification based on a feature attribute corresponding to the node in the port open/closed state feature until a leaf node of the decision tree classifier comprises:

inputting the port open/closed state feature to the decision tree classifier;

determining a first output branch outputted by the port open/closed state feature at the root node of the decision tree classifier based on a feature attribute corresponding to the root node in the port open/closed state feature;

determining a second output branch at an intermediate node corresponding to the first output branch, based on a feature attribute corresponding to the intermediate node in the port open/closed state feature; and transferring the port open/closed state feature from the intermediate node to a corresponding leaf node according to the second output branch.

5. The method according to claim 1, further comprising:
generating a port open/closed state probe packet for probing a target port or all ports in each of the at least two target devices; and the transmitting a port open/closed state probe packet to at least two target devices comprises:

transmitting the port open/closed state probe packet to the target port or all ports of each of the at least two target devices respectively, the transmitted port open/closed state probe packet being used for instructing the target device to generate port open/closed state information of the target port, or port open/closed state information of the all ports, and returning the generated port open/closed state information.

6. The method according to claim 1, further comprising:
generating a network request when a respective one of the at least two target devices is determined as a risk device according to the device type; and transmitting the generated network request to the target device determined as the risk device, to cause the target device to stop service.

7. The method according to claim 1, further comprising:
obtaining a network address or a physical address of the target device; and isolating, when a data packet from the network address or the physical address is received, the data packet, and refusing to respond to a data interaction or data processing operation corresponding to the data packet when the target device is determined as a risk device according to the device type.

8. A computer device, comprising a memory and a processor, the memory storing a computer program that, when executed by the computer program, causing the computer device to implement a device type identification method including:

transmitting a port open/closed state probe packet to at least two target devices;

receiving port open/closed state information returned by the at least two target devices in response to the port open/closed state probe packet, wherein the port open/closed state information comprises port open/closed state vectors indicating whether each port of the at least two target devices is open or closed;

composing the port open/closed state vectors of the at least two target devices into a port state matrix;

determining a mean of data in each row or column of the port state matrix;

calculating a difference between the data in each row or column of the port state matrix and a corresponding mean, to obtain a difference matrix;

determining an eigenvalue of the difference matrix and an eigenvector corresponding to the eigenvalue;

extracting a sub-eigenmatrix from an eigenmatrix composed based on the eigenvector according to a target dimension, and using the sub-eigenmatrix as the port open/closed state feature;

performing decision classification on the port open/closed state feature through a decision tree classifier; and determining a device type of each of the at least two target devices according to a result obtained from the decision classification.

9. The computer device according to claim 8, wherein the extracting a sub-eigenmatrix from an eigenmatrix composed based on the eigenvector according to a target dimension comprises:

arranging the eigenvectors according to an order of values of the eigenvalues, to obtain the eigenmatrix; and extracting a sub-eigenmatrix of the target dimension from the eigenmatrix in descending order of the eigenvalues.

10. The computer device according to claim 8, wherein the performing decision classification on the port open/closed state feature through a decision tree classifier comprises:

starting from a root node of the decision tree classifier, performing the decision classification based on a feature attribute corresponding to the node in the port open/closed state feature until a leaf node of the decision tree classifier.

11. The computer device according to claim 10, wherein the decision tree classifier comprises the root node, the leaf node, and an intermediate node of at least one layer; and the starting from a root node of the decision tree classifier, performing the decision classification based on a feature attribute corresponding to the node in the port open/closed state feature until a leaf node of the decision tree classifier comprises:
- inputting the port open/closed state feature to the decision tree classifier;
- determining a first output branch outputted by the port open/closed state feature at the root node of the decision tree classifier based on a feature attribute corresponding to the root node in the port open/closed state feature;
- determining a second output branch at an intermediate node corresponding to the first output branch, based on a feature attribute corresponding to the intermediate node in the port open/closed state feature; and
- transferring the port open/closed state feature from the intermediate node to a corresponding leaf node according to the second output branch.

12. The computer device according to claim 8, wherein the method further comprises:
- generating a port open/closed state probe packet for probing a target port or all ports in each of the at least two target devices; and
- the transmitting a port open/closed state probe packet to at least two target devices comprises:
- transmitting the port open/closed state probe packet to the target port or all ports of each of the at least two target devices respectively, the transmitted port open/closed state probe packet being used for instructing the target device to generate port open/closed state information of the target port, or port open/closed state information of the all ports, and returning the generated port open/closed state information.

13. The computer device according to claim 8, wherein the method further comprises:
- generating a network request when a respective one of the at least two target devices is determined as a risk device according to the device type; and
- transmitting the generated network request to the target device determined as the risk device, to cause the target device to stop service.

14. The computer device according to claim 8, wherein the method further comprises:
- obtaining a network address or a physical address of the target device; and
- isolating, when a data packet from the network address or the physical address is received, the data packet, and refusing to respond to a data interaction or data processing operation corresponding to the data packet when the target device is determined as a risk device according to the device type.

15. A non-transitory computer-readable storage medium, storing a computer program that, when executed by a processor of a computer device, causes the computer device to implement a device type identification method including:
- transmitting a port open/closed state probe packet to at least two target devices;
- receiving port open/closed state information returned by the at least two target devices in response to the port open/closed state probe packet, wherein the port open/closed state information comprises port open/closed state vectors indicating whether each port of the at least two target devices is open or closed;
- composing the port open/closed state vectors of the at least two target devices into a port state matrix;
- determining a mean of data in each row or column of the port state matrix;
- calculating a difference between the data in each row or column of the port state matrix and a corresponding mean, to obtain a difference matrix;
- determining an eigenvalue of the difference matrix and an eigenvector corresponding to the eigenvalue;
- extracting a sub-eigenmatrix from an eigenmatrix composed based on the eigenvector according to a target dimension, and using the sub-eigenmatrix as the port open/closed state feature;
- performing decision classification on the port open/closed state feature through a decision tree classifier; and
- determining a device type of each of the at least two target devices according to a result obtained from the decision classification.

16. The non-transitory computer-readable storage medium according to claim 15, wherein the extracting a sub-eigenmatrix from an eigenmatrix composed based on the eigenvector according to a target dimension comprises:
- arranging the eigenvectors according to an order of values of the eigenvalues, to obtain the eigenmatrix; and
- extracting a sub-eigenmatrix of the target dimension from the eigenmatrix in descending order of the eigenvalues.

17. The non-transitory computer-readable storage medium according to claim 15, wherein the method further comprises:
- generating a network request when a respective one of the at least two target devices is determined as a risk device according to the device type; and
- transmitting the generated network request to the target device determined as the risk device, to cause the target device to stop service.

* * * * *